United States Patent
Frohne et al.

(10) Patent No.: US 7,214,899 B2
(45) Date of Patent: May 8, 2007

(54) PROCESS FOR THE CONTINUOUS PRODUCTION OF LONGITUDINALLY WELDED METAL TUBES

(76) Inventors: Christian Frohne, Christian-Flemes-Weg 11, D-30657 Hannover (DE); Ernst Hoffmann, Backerweg 11, D-30855 Langenhagen (DE); Rainer Brunn, Schmiedeweg 10, D-29690 Essel (DE)

( * ) Notice: Subject to any disclaimer, the term of this patent is extended or adjusted under 35 U.S.C. 154(b) by 27 days.

(21) Appl. No.: 11/127,801

(22) Filed: May 12, 2005

(65) Prior Publication Data
US 2005/0274697 A1    Dec. 15, 2005

(51) Int. Cl.
*B23K 9/167*    (2006.01)
(52) U.S. Cl. ................... 219/61; 219/75; 219/137 R
(58) Field of Classification Search .............. 219/60 R, 219/61, 75, 137 R
See application file for complete search history.

(56) References Cited

U.S. PATENT DOCUMENTS

| | | | | |
|---|---|---|---|---|
| 3,931,489 | A * | 1/1976 | Roderburg et al. | 219/60 R |
| 4,143,260 | A | 3/1979 | Backstrom et al. | 219/121.36 |
| 5,536,912 | A * | 7/1996 | Staschewski | 219/75 |
| 6,028,283 | A | 2/2000 | Brunken, Sr. | 219/75 |
| 6,054,667 | A | 4/2000 | Bonnet et al. | 219/61 |
| 6,685,082 | B2 * | 2/2004 | Frohne et al. | 228/173.7 |

FOREIGN PATENT DOCUMENTS

| | | |
|---|---|---|
| CA | 974603 | 9/1975 |
| GB | 1 412 300 | * 11/1975 |

OTHER PUBLICATIONS

European Search Report Nov. 30, 2004.

* cited by examiner

*Primary Examiner*—Kevin P. Kerns
(74) *Attorney, Agent, or Firm*—Sofer & Haroun, LLP.

(57) ABSTRACT

A process for the continuous production of longitudinally welded metal tubes where a metal strip (1) is drawn from a strip supply and gradually shaped into a slit tube in a shaping station (2). The slit tube is welded in a welding system (4) along the edges of the strip, and the welded tube (6) is extracted by an extraction device (5). The welding system (4) is a protective gas arc welding system with several electrodes supplied by separate sources (4c, 4d) of welding current. The electrodes are arranged in succession, in the direction of production. The welding system (4) has two welding devices (4a, 4b), whose electrode tips are directed at a common welding point. Only one of the welding devices (4a, 4b) is in operation at any given time, while the other welding device is in a standby position. When an electrode change becomes necessary, the arc of the welding device in the standby position is first struck by means of an auxiliary arc. The welding current intensity of the welding device presently in operation is then reduced, while the welding current intensity of the welding device in the standby position is simultaneously increased.

4 Claims, 1 Drawing Sheet

PROCESS FOR THE CONTINUOUS PRODUCTION OF LONGITUDINALLY WELDED METAL TUBES

RELATED APPLICATION

The present invention is related to and claims the benefit of priority from European Patent Application No. 04 291 437.4, filed on Jun. 9, 2004, the entirety of which is incorporated herein by reference.

FILED OF THE INVENTION

The invention concerns a process for the continuous production of longitudinally welded metal tubes.

BACKGROUND OF THE INVENTION

Various welding processes for the continuous production of longitudinally welded tubes are known.

Processes that are used include not only the high-frequency resistance welding or induction welding process but also the arc welding process (GTAW welding process) and the laser beam welding process. The laser beam welding process in particular has become increasingly important in recent years. Disadvantages of the laser beam welding process are the high capital costs and operating costs and the fact that the welding of metals with a bright surface, e.g., copper, causes problems, since a large portion of the laser energy is reflected by the bright metallic surface and thus is not available for the welding process. In addition, special precautions must be taken to protect personnel from misdirected laser beams.

The high-frequency welding process is characterized by high production rates, but the weld seam leaves much to be desired, so that high-frequency-welded metal tubes are unsuitable for encasing plastic tubes or electrical cables.

DE 22 56 851A describes a system for welding thin plates passing under a stationary welding head, especially for welding the longitudinal edges of a metal strip that has been shaped into a tube. The welding head of this system has three nonconsumable electrodes that are arranged in succession in the direction of the weld seam and supplied by separate current sources. The use of three electrodes serves to increase the welding travel speed, i.e., all three electrodes participate in the welding operation. If one of the electrodes becomes worn out, the welding operation must be interrupted, with the result that the production process must be stopped and started up again or that, in the case of a continuous operation, the longitudinal seam is not welded over a certain length.

The service life of an electrode in the case of arc welding under a protective gas depends on the degree of contamination of the strip material that is used. In practice, lengths of up to 1,000 m can be produced in the case of the welding of aluminum strip.

OBJECTS AND SUMMARY OF THE INVENTION

The objective of the invention is to specify a process for producing longitudinally welded metal tubes with an arc welding system that makes it possible to produce long lengths without interruption of the welding operation.

In addition to the advantages directly apparent from the statement of the objective, the invention offers the further advantage that the production does not have to be interrupted and that productivity can thus be increased.

BRIEF DESCRIPTION OF THE DRAWINGS

The invention is explained in greater detail on the basis of the specific embodiments that are schematically illustrated in FIGS. 1 and 2.

DETAILED DESCRIPTION

Figure 1:
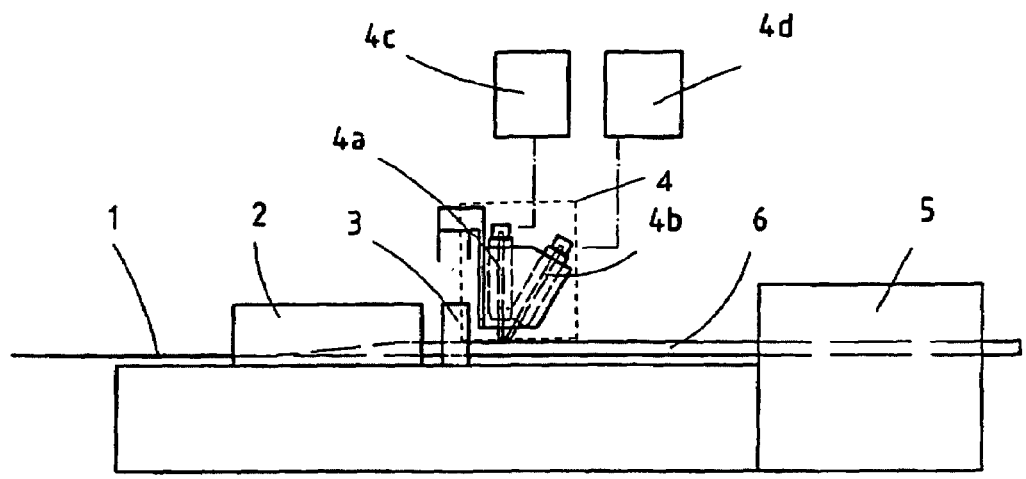
FIG. 1 is diagram of an arc welding system, in accordance with one embodiment of the present invention.

A metal strip 1 drawn from a strip supply (not shown) is fed to a shaping station 2, in which it is gradually shaped into a tube with a longitudinal slit by shaping cones or shaping rolls, which are not shown separately. The tube with a longitudinal slit that emerges from the shaping station 2 then passes through a shaping ring 3, which serves to hold the longitudinal edges of the metal strip 1 in an abutting position.

A welding system 4 is arranged immediately after the shaping ring 3. It consists of the welding devices or welding torches 4a and 4b, which are arranged in succession in the production direction. Each welding device has a non-consumable electrode (not shown).

The welding devices 4a and 4b are combined into a unit in a mounting (not shown), as described, for example, in the above-cited document DE 22 56 851A.

The welding device 4a is preferably vertically oriented, whereas the welding device 4b is oriented at an acute angle of inclination to the longitudinal axis of the metal tube of preferably 30–85°. This embodiment guarantees that the welding device 4a or its electrode comes very close to the shaping ring 3 and thus prevents the longitudinal edges of the metal tube from moving apart.

Each welding device 4a and 4b has its own controllable welding current source 4c and 4d, respectively.

After the welding system 4, an extraction device 5 takes the welded tube 6 and conveys it to another station for further processing, which, for example, can be an extruder for applying a layer of plastic on the welded tube 6.

The process of the invention is carried out, for example, in the following way:

Initially, only one of the welding devices 4a and 4b is used in the welding operation, e.g., welding device 4a. If it is then determined that the electrode of welding device 4a has become worn out, an auxiliary arc is struck by means that are already well known between the tube passing through the welding system and the electrode of welding device 4b. The auxiliary arc has no effect on the arc of the welding device already in operation, but it guarantees stable burning of the arc of the welding device in the standby position. The welding current of welding device 4a is then gradually reduced, and the welding current of welding device 4b is simultaneously increased. The important consideration here is that the sum of the welding currents of the welding devices 4a and 4b more or less corresponds to the current intensity necessary for welding the longitudinal seam of the tube. After the welding current intensity of welding device 4b has reached the required magnitude, welding device 4a is shut off, and the electrode can be replaced.

When the electrode of welding device 4*b* becomes worn out, the operation described about is repeated in the same way.

The process of the invention can be used with special advantage in the production of so-called composite tubes. In this process, a layer of adhesive is first applied to a plastic tube. The metal strip 1 is then formed into a metal tube around the plastic tube, and its longitudinal slit is then welded. The inside diameter of the metal tube is somewhat larger than the outside diameter of the plastic tube that has been provided with a layer of adhesive. After the weld seam has cooled, the welded metal tube has its diameter reduced and is thus pulled down onto the plastic tube. Finally, a layer of adhesive is applied to the outside of the metal tube, and then a second layer of plastic is applied by extrusion.

The composite tubes produced in this way are flexible, light, and diffusion-proof. They are preferably used in floor heating systems.

Figure 2:
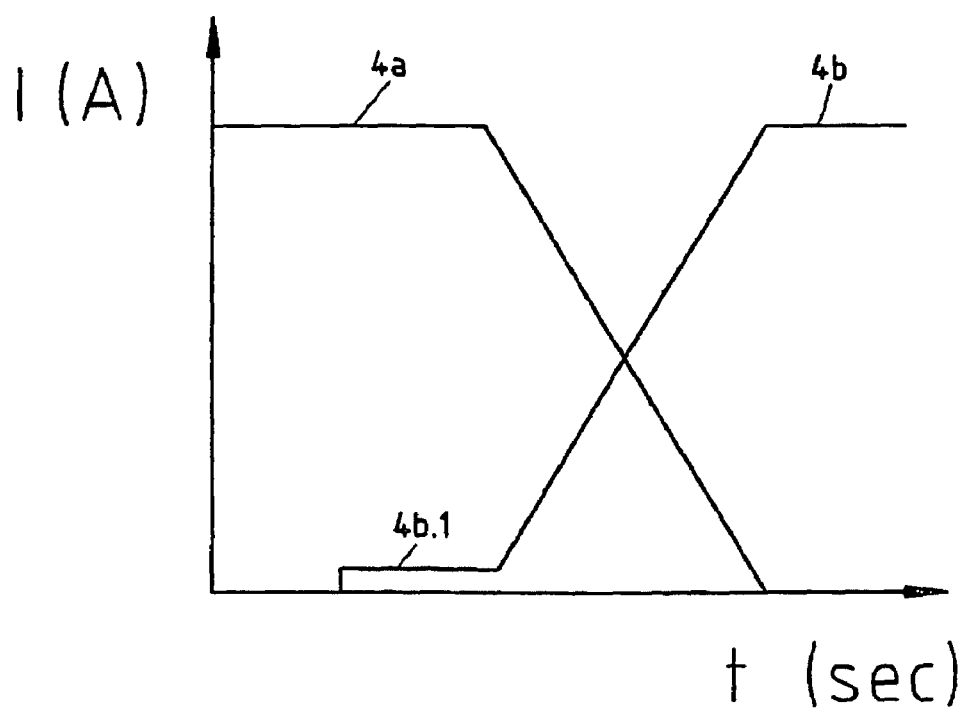
FIG. 2 is a plot of current intensity versus time of the welding device from FIG. 1, in accordance with one embodiment of the present invention.

In FIG. 2, the welding current intensity I of the two welding devices 4*a* and 4*b* is plotted as a function of time t. The welding current intensity of welding device 4*a* (labeled 4*a*) initially runs at a constant magnitude. If it is then determined that the electrode of welding device 4*a* is worn out, an auxiliary arc (see 4*b*. 1) is struck between the tube passing through the welding system and the electrode of welding device 4*b*. The welding current strength of welding device 4*b* is then gradually increased, while the welding current strength of welding device 4*a* is simultaneously reduced.

The invention claimed is:

1. Process for continuous production of longitudinally welded metal tubes, said method comprising the steps of:
   drawing a metal strip from a strip supply;
   gradually shaping said metal strip into a slit tube in a shaping station;
   welding the slit tube in a welding system along edges of the strip; and
   extracting the welded tube by an extraction device,
   wherein the welding system is a protective gas arc welding system with several electrodes supplied by separate sources of welding current, and the electrodes are arranged in succession in the direction of production,
   wherein the welding system has two welding devices, whose electrode tips are directed at a common welding point; that only one of the welding devices is in operation at any given time, while the other welding device is in a standby position; that when an electrode change becomes necessary, an arc of the welding device in the standby position is first struck by means of an auxiliary arc; and that welding current intensity of the welding device presently in operation is then reduced, while the welding current intensity of the welding device in the standby position is simultaneously increased.

2. Process in accordance with claim 1, wherein an electrode is replaced by pulling it up and out of the welding device and pushing a new electrode down and into the welding device.

3. Process in accordance with claim 1, wherein the auxiliary arc has no effect on the arc of the welding device presently in operation but guarantees stable burning of the arc of the welding device in the standby position.

4. Process in accordance with claim 1, in which the last stage of the shaping station is a shaping ring that guides the slit tube, wherein the welding device adjacent to the shaping ring is arranged vertically, and the second welding device, which is arranged after the first welding device in the direction of travel of the tube, is arranged at an angle of inclination to the longitudinal axis of the metal tube of preferably 30–85°.

* * * * *